June 7, 1960  J. WATT  2,940,074
PERMANENT RECORD RADAR SYSTEM
Filed May 17, 1956  6 Sheets-Sheet 1

FIG. 1. (A)

INVENTOR:
James Watt
BY: Baldwin & Wight
ATTORNEYS

INVENTOR:
James Watt
BY: Baldwin & Wight
ATTORNEYS

2,940,074
Patented June 7, 1960

2,940,074

PERMANENT RECORD RADAR SYSTEM

James Watt, Chelmsford, England, assignor to Marconi's Wireless Telegraph Company Limited, London, England, a British company Filed May 17, 1956, Ser. No. 585,471

Claims priority, application Great Britain May 24, 1955

15 Claims. (Cl. 343—11)

This invention relates to radar systems and has for its object to provide improved radar systems, suitable for marine use, observation of moving storms, observation of aircraft at long ranges and in other cases where the targets have relatively slow apparent movement which will provide permanent recorded radar "pictures" similar to those displayed on the screen of the P.P.I. display tube of a normal present day radar.

The P.P.I. display tube presentation of a normal present day radar has a number of practical defects which are important, especially for marine work. In the first place the display is of a transient visual type and there is no record nor (except by virtue of the memory of the observer or as the result of a "plot" made by him) indication of the continual alterations of the "picture" due to the movements of the ship herself and of other ships or moving targets displayed. This is a serious defect from the point of view of observing when risk of collision exists, i.e. when another ship is closing on a constant bearing, and taking avoiding action. Another defect is that it is difficult to produce a display which is easily and clearly visible when the tube screen is subjected to daylight or artificial light of normal intensity and for this reason inconvenient light excluding hoods or screens are usually provided. A further defect is that a cathode ray tube is a relatively expensive and fragile device of limited life requiring the application of high voltage.

The present invention seeks to avoid the foregoing defects of the normal cathode ray tube radar display and to provide a radar system wherein a radar "picture," resembling a P.P.I. picture, is permanently recorded. An ordinary electro-chemical or other recorder with a mechanically moved stylus having radial and circular components of deflection of the same speed as and corresponding to those components of a P.P.I. display cathode ray tube is obviously impractical for it is inconceivable that a mechanically moved recorder, such as a stylus, could be moved radially at anything approaching the speed of radial (range) deflection in a P.P.I. cathode ray tube.

According to this invention a radar system comprises means for producing and receiving radio echo signals from radio reflecting objects in different directions from the system; means for varying the directivity of said system in azimuth; a record surface; at least one signal operable recorder adapted to record signals upon said surface; means for producing relative motion between the recorder and the surface to cause the former to scan an area of the latter in a pattern or raster; said relative motion being comprised of a circular component and a radial component and said radial component being at a speed which is very much slower than the speed of radial deflection of the cathode ray tube spot in a normal P.P.I. radar display tube; means for producing a control signal dependent upon said radial component of motion; and means controlled by said control signal for passing to said recorder, signals derived from echo signals whose echo time is in predetermined relationship to said control signal, said signals being passed to said recorder at times when the position thereof, with respect to its circular component of relative motion, corresponds to the instantaneous directivity of the system in azimuth.

The circuit component of relative motion may be synchronous with the variation of directivity in azimuth, in which case, of course, the position of the recorder with respect to its circular component of relative motion, will always correspond to the instantaneous directivity of the system in azimuth. This, however, though convenient, is not theoretically necessary and the variation of directivity in azimuth need not be synchronous with and may be at a very different speed from the circular component of relative motion. In such a case, however, the signal channel to the recorder must be gated to ensure that it is only open when the circular position of the recorder and the azimuth directivity correspond.

The radial component may be a relatively high speed periodic linear component—the speed, though relatively high, is still very much slower than the radial deflection speed in a normal P.P.I. radar display tube—and the circular component may be at relatively slow speed in which case the raster will be composed of a plurality of substantially radial lines in a circle. However the radial component may be at relatively slow speed and the circular component at relatively high speed, in which case the raster will be composed of a close pitch spiral. The control signal may be a saw tooth wave produced across a condenser by means including means for producing a predetermined state of charge in said condenser at a predetermined point in each cycle of the radial component of movement, and means for changing said state of charge substantially linearly until said point is next reached.

The invention is applicable to both pulsed radar systems and to frequency modulated continuous wave (F.M.) radar systems. In the latter case the system may be of the well known so-called panoramic receiver type in which beat frequencies, produced by mixing received signals with transmitted signals, are swept across a narrow pass band filter by a variable frequency oscillator, and, the control signal may be applied to control the frequency of the swept oscillator. In applying the invention to a pulsed radar system, the control voltage may be employed to produce, at each transmitted pulse, a delayed pulse delayed by an amount determined by said control voltage and said delayed pulses employed to open a normally closed "gate" in the signal channel to the recorder.

The recorder may conveniently consist of a plurality of recording styluses spaced apart along an endless belt driven at a speed which determines the radial component of relative motion, said belt being arranged to carry said stylus to contact with the record surface in immediate succession and to move in immediate succession along a radial line in which said belt lies, means being provided for rotating said belt about one end of said radial line.

Means may be provided for producing between the recorder and the recording surface relative motion, additional to that previously mentioned, in a direction and by an amount representative of the ship's compass course and logged motion respectively, said additional relative motion being obtained by a ship's log repeater motor arranged to produce such motion in a direction determined by a ship's compass repeater motor. If desired, however, the record surface may be simply moved linearly under the recorder by a ship's log repeater motor or it may be left stationary altogether.

The invention is illustrated in the accompanying drawings which show, diagrammatically and schematically a number of embodiments. In the description of these embodiments typical practical numerical examples of frequencies, speeds and so on will be given. It is to be understood however, that these are solely by way of example and in no sense limiting.

Figure 1:
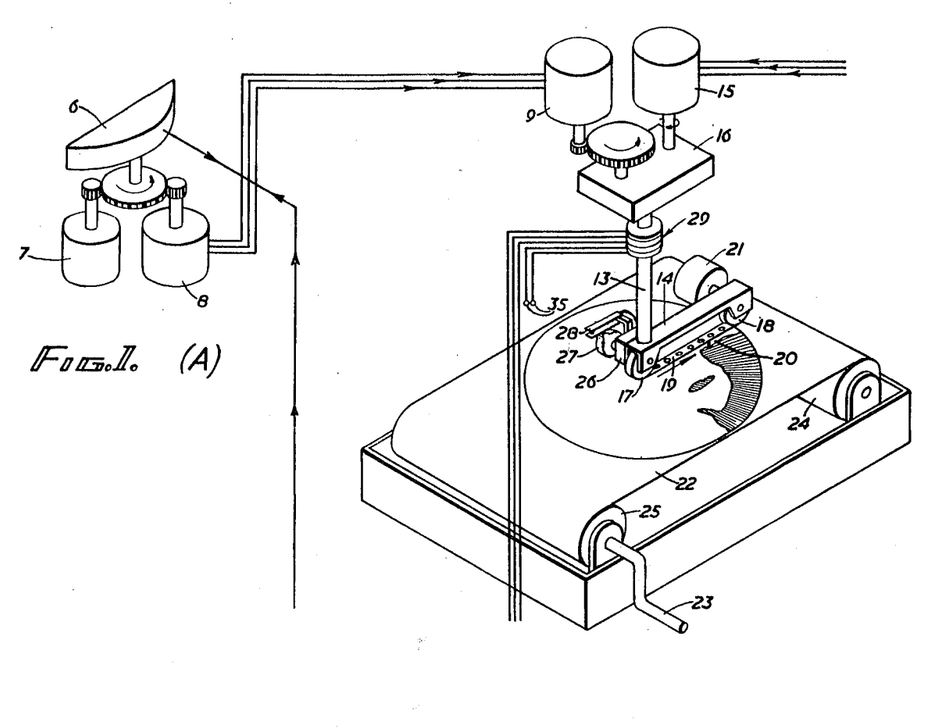
Figure 1(A) is a perspective view of one form of recorder operable in connection with other components in accordance with the invention.
Figure 1(B) is a diagram of a circuit arrangement for generating and transmitting signals, and also a receiver gated to pass pulses derived from the transmitter pulse generator. This figure is to be considered as associated directly with Figure 1(A)

Referring to Fig. 1 (formed by a combination of Figs. 1A and 1B the radar system therein shown is of the pulsed type and compromises a trigger pulse generator 1 producing trigger pulses at 2000 c./s. These are fed to a pulse shaping stage 2 which forms therefrom substantially rectangular pulses each 1 $\mu$s. long which are fed to a so-called modulator 3 switching on and off a very high radio frequency oscillator 4 such as a magnetron. The 1 $\mu$sec. pulses of radio frequency, at a pulse repetition frequency of 2000 c./s., are fed through a transmitter blocking cell 5 to a directional aerial 6 which is rotated is azimuth at 1 r.p.m. by a motor 7. A magslip transmitter 8 is driven with the aerial and produces an output representative of the azimuth variation of the aerial to drive a magslip receiver 9 in synchronism with the magslip transmitter. Received echo signals picked up by the aerial 6 are fed through a T.R. cell 10 to a radar receiver 11 whose output, consisting of video echo signals, will appear on lead 12. The apparatus 1 to 11 is all very well known and requires no further description here.

The magslip receiver 9 drives a shaft 13 on which is a radial arm 14. The drive may be direct and such that the rotary position at any instant of the arm 14 corresponds to the rotary position, at that instant, of the aerial 6 in relation to ship's head or, as indicated, the rotary position of the arm may be made to correspond to that of the aerial in relation to north. To achieve this result a compass repeater motor 15, controlled in well known manner to follow the ship's gyro-compass, is provided. The parts 9 and 15 jointly drive the shaft 13 through a differential gear within the gear box 16. Such a differential drive arrangement to superimpose compass information on aerial rotation information is very well known per se and requires no further description here.

Carried by the arm 14 are two sprocket wheels 17 and 18 over which runs a perforated metal belt 19 carrying three equally spaced recording styluses of which one is shown at 20. The belt is driven at constant speed by an electric motor 21. The axis pins of the wheels 17 and 18 are parallel to one another and to the surface 22 of an electro-chemical recording paper which can be wound, by means of a handle 23, off one roller 24 on to another 25. The axis of the shaft 13 passes perpendicularly through the middle of axis pin of the wheel 17. The belt 19 is so arranged that, when the motor 21 is running, each stylus moves in turn, in contact with the paper, from a point under the axis pin of wheel 17 to a point under the axis pin of wheel 18, each stylus coming on to the paper as the one in front leaves it. The speed of the motor is such that each such radial traverse takes $\frac{1}{20}$ of a second. Therefore, in one minute taken by the aerial 6 to rotate through 360° the stylus system will trace out 1200 radii of a circle centred on the axis of the shaft 13.

Driven by the wheel 17 through suitable gearing in a box 26 is a cam 27 arranged momentarily to close contacts 28 each time a stylus starts a radial traverse. These contacts are connected through the top two of five slip rings 29 and a low value current limiting resistance 30 across a condenser 31 which is charged through a high resistance 32 from a D.C. source connected at 33. One terminal 34 of the condenser 31 is connected at 34 to an adjustable bias source. Accordingly a saw tooth voltage wave will be produced across condenser 31, this voltage starting at a minimum at the commencement of each radial traverse, rising substantially linearly as the traverse proceeds and reaching a maximum at the end of the traverse. The driving voltage for the motor 21 is applied at 35 and fed to the motor through the two bottom slip rings at 29. The middle slip ring is used for feeding signals via the metal belt 19 to the styluses (as will later be described) to cause marking of the recording paper.

Positive going video signals from receiver 11 are fed to the control grid of a gated pentode 36 which is adjusted to pass them only when they coincide with 1.8 $\mu$s. gating pulses which are applied to its suppressor grid. These pulses are produced by a gas filled discharge tube 37 which is triggered by pulses which are subjected to a variable delay directly related to the voltage across the condenser 31 and therefore to the position of a stylus in its radial trace. These triggering pulses are delivered by a so-called "multiar" circuit comprising pentode 38 and diode 39 and are fed to the tube 37 through an amplifier 40. The diodes 41 and 42 in conjunction with the pentode 43 and diode 44 are connected to act as a so-called "monostable screen-coupled phantastron." The "multiar" and "monostable screen-coupled phantastron" circuits are known per se and are described in volume 19 of the M.I.T. Radiation Laboratory series (to which reference may be made for further information), the former being described in Section 9.14 and shown in Fig. 9.20 on page 343 and the latter being described in Section 5.16 and illustrated in Fig. 5.46 on page 197. At substantially the same instant that a radar pulse is transmitted from the aerial 6 the phantastron circuit is triggered by a pulse fed over lead 45 from the pulse source 1. Miller action is thus initiated and the anode of the valve 43 falls linearly and rapidly as described in the M.I.T. publication referred to. The circuit is so dimensioned that the fall of voltage occurring at the input of the multiar circuit takes a little more than 180 $\mu$s. The delay controlling reference voltage of the multiar circuit is derived from the voltage across the condenser 31 and fed in via the D.C. coupled phase reversing amplifier 46 at the output of which is a linearly falling saw tooth voltage wave whose value, at any instant, is a measure of the progress of a stylus 20 along a radial traverse.

The maximum voltage at the output of the amplifier 46 is arranged to be very slightly lower than the maximum voltage from which the anode of the valve 43 starts to fall. Thus, at or immediately after the beginning of each radial traverse the diode 39 is just in the nonconducting condition at the instant the linear voltage drop commences on the anode of the valve 43. As the traverse proceeds and the voltage across condenser 31 increases so that the output voltage from amplifier 46 decreases, the anode of diode 39 becomes increasingly negative in relation to the potential on its cathode at the instant the linear voltage drop on the anode of valve 43 commences. The diode becomes conductive when its cathode is driven negative by the high speed negative going voltage from the anode of valve 43 and, when the said diode conducts, it completes the feed back loop of the multiar circuit including valve 38 via the transformer 47, and, since this transformer is so connected as to result in positive feed back, said valve 38 is rapidly cut off, producing at its cathode a short negative going pulse which is amplified and inverted by the amplifier 40 and triggers the tube 37. On completion of the fall of voltage at its anode the valve 43 returns to its initial condition with its anode at the initial positive voltage, and returns the multiar circuit to the quiescent condition. Thus each pulse from the source 1 produces a delayed pulse from tube 37 to open the gate valve 36, the delay between any pulse from source 1 and the subsequent opening of the gate 36 being dependent on the voltage across condenser 31 and therefore on the progress of a stylus in a radial traverse. The limits between which the output voltage from the amplifier 46 varies are so chosen that the delay between each pulse from source 1 and the resulting opening of gate 36 increases uniformly from practically zero to a maximum of 180 μsec. as each stylus moves through its radial traverse. The echo time for a range of 15 miles is approximately 180 μs. so each radial traverse corresponds to a range coverage of 0–15 miles (approximately).

The gated output from valve 36 is amplified by amplifier 48 and applied as positive going signals, to the grid of a normally cut off cathode follower valve 49 which is arranged to act as a pulse-stretching stage. This action is obtained by reason of the fact that the discharge time given by the resistance-capacity combination 50.51 in the cathode circuit is arranged to be long relative to the charging time of the said capacity 51 when it is charged by the output of the valve 49 through the internal impedance of said valve. The discharge time is selected to be of the same order as the pulse repetition period and the pulses occur, of course, at 2000 c./s. In practice the length of each gated pulse applied to the valve 49 may be 1 μs. or less and it is desired to stretch it into a pulse of the order of 200 μsecs. long. If necessary more than one pulse stretching stage may be provided to accomplish this.

The positive going stretched pulses from valve 49 are applied to an amplifier 52 which is biased almost to cut-off and the amplified negative going signals are fed to the grid of a valve 53 connected in known manner to modulate, in the upward direction, the oscillations from a known oscillation generator including valve 54. This oscillator may operate at, for example, 100 kc./s. The modulated oscillations are amplified in a further amplifier 55 and fed over lead 56 to the stylus carrying belt 19. The output from amplifier 55 will therefore be in the form of 100 kc./s. trains. As is well known such trains are most suited for recording on certain types of electrochemical recording paper.

The 1.8 μs. pulses applied to the gate 36 are, as stated, produced by the soft valve 37 the circuit of which is known per se. As shown this valve, when triggered, discharges a delay line 57 into its cathode resistance 58 of substantially the same value as the delay line characteristic impedance. The effective length of the delay line is chosen to be 0.9 μs. and therefore, as is well known, the pulses delivered to the suppressor grid of valve 36 will be each 1.8 μs. long and positive going.

It will thus be seen that, although the radial motion of each stylus is very much slower than would be the radial deflection of the cathode ray tube spot of a normal P.P.I. display tube, each mark produced by a stylus will be in a position whose direction, with reference to the intersection of the axis 13 with the plane of the recording paper, corresponds to the direction of target producing the echo signals resulting in that mark and whose distance, with reference to that intersection, corresponds to the range of that target. Therefore the system will produce an inscribed permanent record of the same nature as the display given by a P.P.I. tube, taking 1 minute to record a complete circle of azimuth.

In use the apparatus may be allowed to run for a number of minutes without moving the recording paper and when desired the handle 23 may be turned and a new paper surface fed in under the recording system. With compass information fed in as shown by motor 15 the record will be with reference to compass north and the bearings of targets recorded will be compass bearings. If compass information is not fed in the record will be with reference to ship's head and the recorded bearings will be relative to ship's head. The handle 23 may, if desired, be replaced by a drive from the ship's log so that relative motion between the recording system and the paper is produced corresponding to the ship's motion through the water. If the ship is steaming with a constant course, an arrangement with the paper driven by the ship's log with or without compass information fed in will show the tracks of all other ships within radar range in a manner most convenient for determining whether or not risk of collision exists and what avoiding action should be taken.

Figure 2:
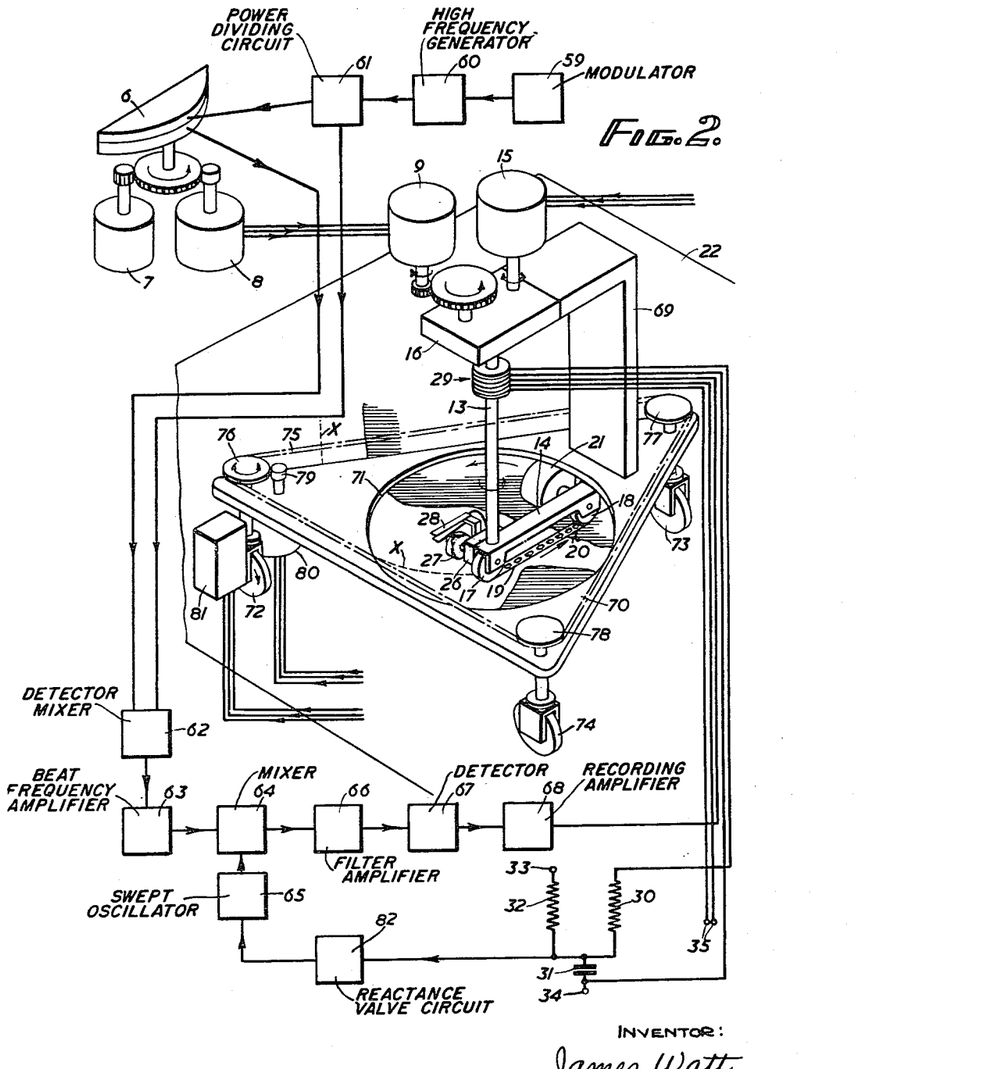
Figure 2 shows an embodiment of the instant invention in which a spiral scan as applied to a radar system of the frequency modulated continuous wave type is used.

In the system of Fig. 1 the speed of aerial rotation is slow (1 r.p.m.) and the recording system has two components of movement, a rotating component at aerial speed and a radial component at relatively high speed (1/20 of a second per radial traverse) so that the record picture is built up much as in a P.P.I. display. This, however, is not a necessary arrangement and a high speed rotating aerial may be used, e.g. one rotating at 100 r.p.m. with the recording system rotating synchronously at the same speed but, however, subjected to a slow speed radial component. If this is done the record picture will again resemble that produced by a P.P.I. display but instead of being traced out by a series of radial scans, it will be traced out by a continuous spiral scan. Thus if the full change of radius takes 1 minute to accomplish and the aerial rotation speed is 100 r.p.m. the complete picture will be traced in one minute by a spiral scan of uniform pitch equal to 1% of the radius of the picture. This type of arrangement presents more mechanical difficulties than does that of Fig. 1, but, on the other hand, it has the advantage that the signals fed to the recording system may be also used to operate a conventional P.P.I. tube display of moderate screen persistance at the same time as the record is made. Fig. 2 shows an embodiment of the spiral scan type as applied to a radar system of the frequency modulated continuous wave type (F.M. radar). Like references are used for like parts in Figs. 1 and 2.

Referring to Figure 2 a 500 c./s. saw tooth modulating generator 59 modulates, in the usual saw-tooth fashion, the very high frequency continuous waves delivered by a klystron or other generator 60 which feeds aerial 6 through a suitable known power dividing circuit 61 which also feeds a small part of the power to a detector-mixer 62 to which echo signals from the aerial 6 are also fed. The rate of change of transmitted frequency may be 220 mc./s./sec. over the working part of the modulated saw tooth and, with this figure the beat frequencies fed out from the detector 62 resulting from echoes from targets of up to 15 miles range will be 0–40 kc./s. The aerial is rotated at 100 r.p.m. by the motor 7 and drives a magslip transmitter 8 as in Fig. 1.

The beat frequency output is amplified in a beat frequency amplifier 63 and fed to a mixer 64 whose second input is obtained from a so-called swept oscillator 65 whose frequency is swept over the range 114–150 kc./s. Output from the mixer 64 is fed to a filter-amplifier 66 selective to 110 kc./s. and having a pass band 500 c./s. wide and the selected output therefrom is detected by a detector 67 and amplified in a recording amplifier 68 which may comprise a modulated oscillator and amplifier as shown at 53, 54 and 55 of Fig. 1. As so far described the system is an ordinary well known F.M. radar of the so-called "panoramic receiver" type and requires no further description here.

The recording system of Fig. 2 resembles that of Fig. 1 with bar 14 rotated in synchronism with the aerial 6 (at 100 r.p.m. however) by the magslip receiver and, as shown, with compass information fed in by the motor 15. The belt and stylus arrangement 19—20 and the cam driven contact arrangement 26—27—28 are all as in Fig. 1 but the motor 21 is a slow speed motor arranged to give one radial traverse of a stylus in 1 minute. The recording paper 22 is, however, on the surface of a large table (the paper is shown broken away). The paper is stored on rollers (not shown) much as in Fig. 1 so that the part over the table may be renewed from time to time.

The whole mechanical system including motors 9, 15 and 16, drive shaft 13, and stylus and contact system associated therewith is mounted by a pillar 69 on a movable platform 70 having a central viewing hole 71 through which the shaft 13 passes. This platform has three corner castor wheels 72, 73 and 74 which rest on the paper 22, and which can be swivelled about vertical axes but which always lie in parallel planes. The wheels are swivelled together by a chain 75 running over chain sprocket wheels 76, 77, 78, one on each swivel axis. The sprocket 76 is driven through gearing 79 by a compass repeater motor 80 so that the planes of the three castor wheels are swivelled to correspond with the ship's compass course. The wheel 72 is rotated about its own axis by a ship's log repeater motor 81. It will be obvious therefore that the movement of the platform 70 over the recording paper will correspond, in direction and amount, to the ship's movement through the water. An additional, intermittently energised stylus (not shown) may be arranged to contact the paper under the shaft 13 and if this is done it will draw out the ship's track (shown dotted at X) on the paper.

A saw tooth wave is produced across the condenser 31 exactly as in Fig. 1 and, as before, the instantaneous value of the voltage across this condenser will correspond to the radial position of a stylus during a radial traverse. This voltage, is however, used to control the reactance exhibited by a reactance valve circuit 82 of any well known kind, the reactance of which is included in a frequency determining circuit of the oscillator 65. The arrangement is such that the whole of one sweep of voltage of condenser 31 except for the initial 10% (or thereabouts) sweeps the frequency of the oscillator 65 through its range of 114–150 kc./s. thus successively passing through the 110 kc./s. filter beat frequencies in the band 4 to 40 kc./s. corresponding to echoes from ranges from 1.5 to 15 miles, and accordingly any signal passed through the filter 66 and elements 67, 68 to a recording stylus to be recorded thereby will be from a target whose direction corresponds to the direction (at that moment) of the arm 14 and whose range corresponds to the distance (at that moment) of the recording stylus from the axis of shaft 13. When the platform has moved near an edge of the table on which is the paper 22, it is moved back again by hand and a new piece of recording paper put in place. While however the platform is moving automatically the continuously changing "radar scene" is continuously recorded as a picture: in fact the system of Fig. 2 gives a continuous navigation plot.

Obviously the means shown in Fig. 2 for giving a continuous plot might be used in a system as shown in Figure 1: in other words the radial line recording system

9–15–16–29–13–14–17–18–19–20–21–26–27–28 of Fig. 1 might be carried on an automatically moved platform as described with reference to Fig. 2. Similarly a spiral line recording system as shown in Fig. 2 could be used in any of the ways described for the recording system of Fig. 1, e.g. with or without compass information injection and with or without log information injection. Also the spiral type of recording scan could be used with a pulsed radar system instead of with a F.M. radar system. One such arrangement could obviously consist of a combination of the parts and circuits shown in Figs. 1 and 2, the voltage produced across the condenser 31 of Fig. 2 being applied to control the pulse delay in a delayed gating pulse circuit arrangement controlling the received signals of a pulsed radar as shown in Fig. 1, except, of course, that the aerial rotation speed would be high and the radial stylus speed slow. Similarly the radial type of scan could be used in a F.M. radar system by, for example, applying the rapidly changing voltage produced across the condenser 31 of Fig. 1 to control the swept oscillator 65 of a F.M. radar system as shown in Fig. 1, but with a slowly rotating aerial and a high radial stylus speed.

Figure 3:
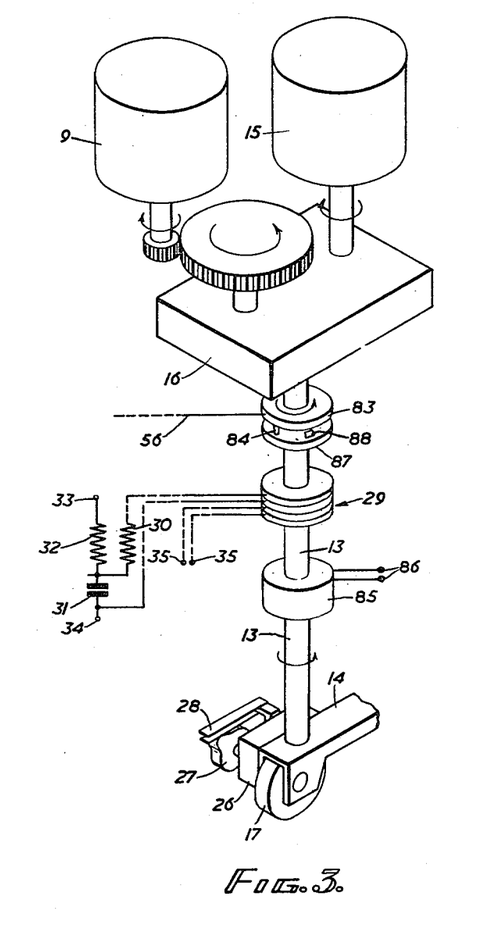
Figure 3 illustrates an arrangement in which a gear box is used to drive a slip ring carrying signals to the recorder.

As already stated earlier in this specification it is not, theoretically, necessary that the arm (14 of Figs. 1 and 2) carrying the stylus system rotate in synchronism with the aerial and the two rotations may be entirely independent and at quite different speeds so long as means are provided for preventing the recording of signals except when the momentary directions of the aerial and arm coincide. Fig. 3 shows, sufficiently to provide an understanding thereof, a modification of this nature wherein the arm 14 rotates at a much higher speed than the aerial. The parts not shown in Fig. 3 may be as shown in either Fig. 1 or Fig. 2. Referring to Fig. 3, the gearbox 16 no longer drives the shaft 13 but instead drives a slip ring 83 through which connection is made between the lead 56 carrying the signals to be recorded and a spring contact 84 carried by the disc structure on which the slip ring is mounted. The shaft 13 for driving the arm 14 is independently rotated at any desired speed by a separate motor 85 to which connection is made from terminals 86. The slip rings in the group 29 of rings provide connection from terminals 35 to the stylus driving motor (not shown in Fig. 3) and, via resistance 30, to the terminals of condenser 31, all as in Figs. 1 and 2. The said shaft 13 also drives an insulating disc 87 which is arranged under the disc structure of the slip ring 83 and in which is a metallic insert 88 which is connected to the stylus belt. As will be seen the arrangement is such that the contact 84 and the insert 88 will complete the stylus circuit once only per revolution of the disc 87 with relation to the slip ring 83 and this is arranged to occur when the alignment of the aerial and of the arm 14 correspond. At all other times the recorder circuit is open at the rotary switch constituted by the parts 84 and 88.

Figures 4, 4A:
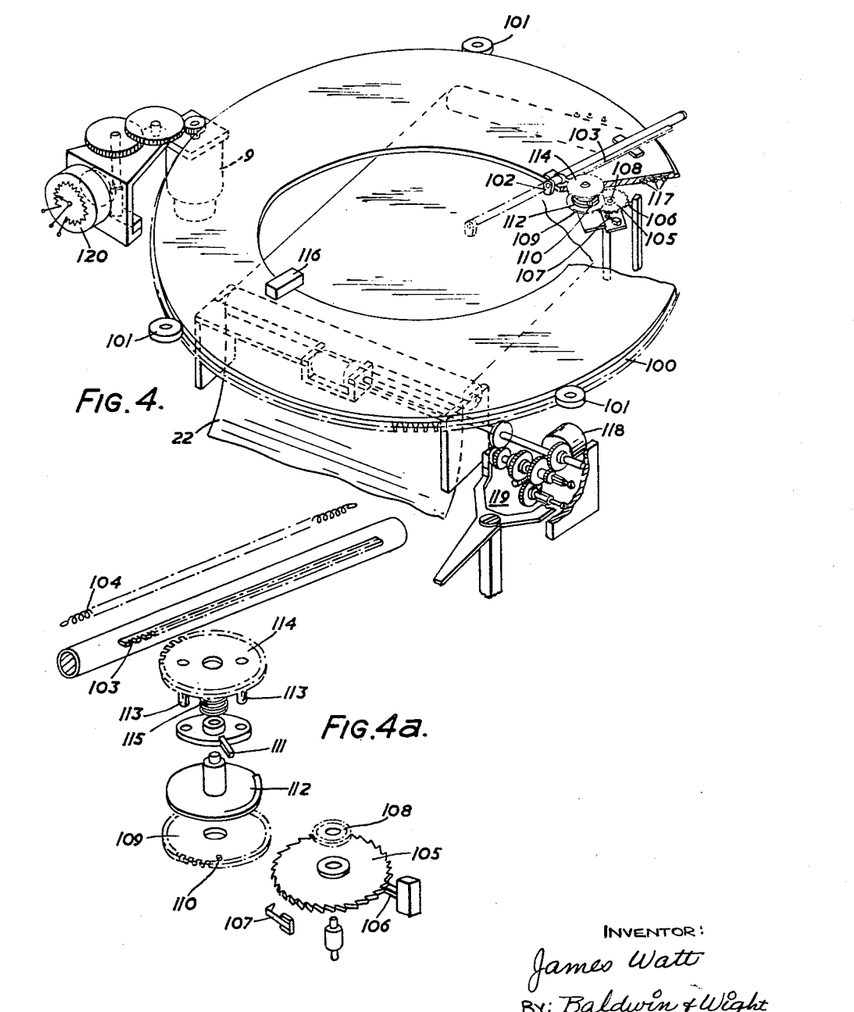
Figure 4 shows a mechanical arrangement which provides a special scan similar to that provided by the apparatus in Figure 2, but which may be substituted for the mechanical arrangement incorporated in that figure.
Figure 4a is an exploded perspective view showing certain parts of mechanical scanning arrangement shown in Figure 4.

Fig. 4 shows, so far as is necessary to an understanding thereof, a preferred mechanical arrangement adapted to provide a special scan like that provided by the apparatus of Fig. 2 and which may, with advantage, be substituted for the mechanical arrangement incorporated in the said Fig. 2. Fig. 4a is an exploded view of certain of the parts included in Fig. 4. As will be apparent later the arrangement of Figs. 4 and 4a uses, in place of the multiple-stylus carrying belt of Fig. 2, a rotating ring carrying a radially moving stylus head. This is considerably better, mechanically, than the apparatus of Fig. 2, gives a clearer view of the recorded picture and has certain other advantages which will be apparent later. The recorder of Fig. 4 may be operated with the circuit arrangement shown in Fig. 1 by replacing the control voltage source shown in Fig. 1 as consisting of condenser 31 and the elements 32 and 30 with supply voltages at 33 and 34. The control voltage in the embodiment shown in Fig. 4 is generated by the radial potentiometer 120. In practice this system is operated by combining the recorder in Fig. 4 with the circuit arrangement for generating the recorder signals as shown in Fig. 1.

Referring to Figs. 4 and 4a a peripherally toothed ring 100, having a central hole rather greater in diameter than the diameter of the required record picture, is supported on ball races 101 and driven in synchronism with the radar aerial (not shown) by a magslip system, the final driving motor of which is indicated at 9. This motor drives the ring 100 by means of a pinion engaging on the ring 100 as shown and giving a 16 to 1 gear ratio. To quote practical figures the ring rotation may be at 60 r.p.m. As in the previous embodiments the magslip drive from aerial to motor 9 may be direct or it may include any known means for injecting compass information from a transmitting gyro compass unit (not shown) provided in the ship. There is a recording stylus carried by a stylus head 102 at the inner end of a radially movable movable stylus arm carrying a rack 103. The stylus arm is carried by the ring 100 and is biased to its outward extreme position by a return spring 104. In each rotation of the ring 100 a ratchet wheel 105, carried by the ring, comes in contact with a fixed striker 106 and is thus rotated through one tooth, being retained in its new position by a spring pawl 107. Co-axial with wheel 105 and keyed thereto is a pinion 108 which drives a gear wheel 109 on which is a small upstanding block 110. This block 110 pushes before it a cam follower 111 which rides on a cam 112. The cam does not rotate but the cam follower 111 does. It has two holes which are engaged by pins 113 depending from a pinion 114 engaging the rack 103. A pressure spring 115 presses the cam follower down towards the cam.

With this arrangement, so long as the cam follower has not reached the highest point on the cam it is in the path of the block 110 and accordingly transmits rotation to the pinion 114 to drive the stylus arm radially inward. The arrangement is such that on fifty nine successive revolutions of the ring 100 each tooth advance of ratchet wheel 105 will produce a small inward motion of the stylus but on the sixtieth revolution the cam follower reaches the highest point of the cam which is high enough to bring it clear of the block 110. The pinion 114 is accordingly freed and the return spring 104 accordingly returns the stylus at high sped to its original outward position and the cycle of operations recommences. It will be seen that the track followed by the stylus is not, strictly speaking, a spiral but a continuous succession of circular paths of decreasing radius, the radii decreasing in steps one of which is effected each time the ratchet wheel is moved forward a tooth. This path is a close approximation to a spiral and the term "spiral" is used in this specification in a broader sense than the strict geometrical sense to include such an approximation thereto.

An indicator lamp in an arrowed box 116 is mounted on the rotating ring 100 and is energised through slip rings 117 in the underside of ring 100. Ideally this lamp would be mounted on the same radius of the ring 100 as the styli and would be arranged to be flashed in any convenient manner known per se when the rotating aerial was directed on some selected bearing, e.g. dead ahead in the case of a shipborne equipment. The purpose of this device is to indicate correct alignment of the recording system with the rotating aerial, and/or to indicate at the recorder unit any changes of ship's course when injection of compass information is in use. In practice, for the sake of convenience in design, the lamp unit 116 is mounted on the ring 100 diametrically opposite the styli and the lamp is caused to flash when the rotating aerial is directed 180° away from the selected bearing. It will be obvious that the desired result is thereby obtained. The slip rings 117 also serve for the supply of signals to be recorded to the recording styli. The recording paper 22 is driven over rollers as shown by a so-called Ledex or other suitable step by step operated motor 118, a two-speed change-speed gearbox 119 being shown incorporated in the drive to enable either of two speeds of paper to be obtained.

In the arrangement of Figs. 1 and 2 the control signal is a saw tooth wave produced across the condenser 31 charged through the high resistance 32 from a source 33 and discharged periodically. Fig. 4 shows a preferred way of producing the saw tooth control signal. This is by employing a rotary potentiometer 120 the slider of which is driven from motor 9 through gearing such as to give a 60:1 gear ratio between the ring 100 and the slider. The potentiometer which is diagrammatically indicated on the end of the representation 120, consists of a resistance embracing nearly a circle with a slider arranged to be rotated round it. Suitable voltage is applied to the ends of the resistance and a saw tooth wave voltage will accordingly appear between the slider and one end of the resistance. This voltage may be used in exactly the same way as that produced across condenser 31 in Fig. 2. The wear on the potentiometer will be very small since its slider only runs at 1 r.p.m. and its use is considered preferable to that of the arrangement including condenser 31 of Fig. 2 for an embodiment with spiral scanning and a slow radial component of movement, since in such an embodiment inconveniently high values of resistance and condenser are necessary to obtain the required long time constant.

It will be noted that the rotation of the potentiometer is continuous whereas the radially inward movement of the stylus is in steps. If the system is set up so as to record range precisely at the middle of the rotation of the ring 100 there will be small positive errors on one side of this position and small negative ones on the other. These errors are, however, considered too small to be other than negligible but they could be reduced, if desired, by arranging for the inward movement of the stylus to occur in a number of steps per revolution of the ring 100, instead of in only one step per revolution e.g. by providing additional strikers 106 round the ring and arranging each of them to impart an appropriately reduced drive to the stylus arm driving pinion 114.

In all the arrangements so far described it is possible, theoretically at any rate, to decrease the time needed to build up a picture with a given range discrimination by increasing the number of styli in use at one time. Thus, in the arrangement of Fig. 1 it would be possible to have two sets of styli on the belt 19, the styli of each set being insulated from the other and fed from its own recording amplifier and preceding gating arrangement. Though this is possible it is mechanically inconvenient, for the provision of two mutually insulated and separately fed sets of styli on the belt 19 would prevent obvious serious practical difficulties.

The type of arrangement of Fig. 4 is much better suited to modification by the provision of a plurality of styli. Thus for example, two recording styli, insulated from one another and spaced in a radial direction, could be provided on the stylus head each being fed from a separate recording amplifier with signals derived from separate gated amplifiers separately gated by time-spaced gating pulses with a time delay between them corresponding to the radial separation of the two styli on the recording paper. Thus the complete gate pulse system including valves 43, 44, 39, 38 and 40 (see Fig. 1) could be duplicated, one system being provided for each stylus. However, this would involve practical difficulties in accurately ensuring the required relative timing of the two sets of gating pulses. It is therefore preferred to duplicate only that part of the circuit including valves 37, 36, 48, 49, 52, 53, 54 and 55 and to provide for the second stylus a gating pulse generating stage (corresponding to the stage including valve 37) triggered by the same pulses employed to trigger the stage 37 in the chain to the first stylus but delayed by the inclusion, in the circuit feeding those pulses to the said generating stage, of a delay line giving a time delay corresponding to the radial separation of the two styli.

Although it would be possible to separate the two styli by a radial distance such that they would record on adjacent circular tracks, such close separation presents mechanical difficulties since they have to be insulated from one another. It is therefore preferred to increase the spacing and a spacing of three lines is considered practical and convenient. With this arranged the first and fourth circular lines would be simultaneously traced in the first revolution of ring 100; the third and sixth would be traced in the second revolution; the fifth and seventh in the third revolution . . . and so on. In this way the picture scan would be built up of two interlaced spirals—more strictly approximate spirals—which could, however, not be quite complete since the second line would be omitted. This however, is not considered a significant defect. Three slip rings 117 are shown in the ring 100 of Fig. 4. The number of rings provided in any case would, of course, depend on the number of styli.

Figure 5:
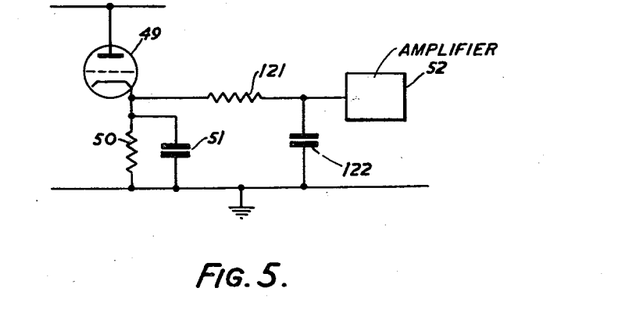
Figure 5 is a fragmentary diagram showing an arrangement for preventing reception of random noise.
Figure 6:
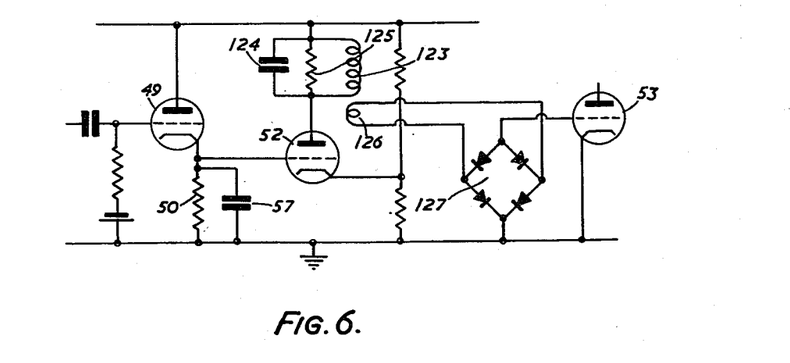
Figure 6 is a fragmentary diagram of a modified circuit arrangement for preventing reception of random noise.

In practice it will often be desirable to protect the radar receiver from interferences by random noise and/or other pulsed radar equipments which might be in its neighbourhood. Consider the case of a pulsed radar installation in accordance with this invention having a directional aerial rotating at 60 r.p.m. and providing a transmitted beam with a divergence (in the horizontal plane) of 1.8°, the type of scan being spiral, as in Fig. 2 or 4. If the radar pulse repetition frequency is 1200 pulses per second, a point target in space will be "illuminated" by the radar beam for about .005 sec., and echo pulses should be received from it in about six successive pulse repetition periods. In such a case protection against random noise and nearby pulsed radar sets would be a real advantage and it is proposed to provide such protection by the inclusion of means for ensuring full response only to a train of an appropriate number of pulses (in this example say 5 pulses) at the radar pulse repetition frequency, with no or only weak response to single pulses. Such means could be inserted at any convenient point between the output of the gated amplifier 36 and the input to the recording amplifier 53 of Fig. 1. Figs. 5 and 6 show two suitable protection circuits.

Referring to Fig. 5 a resistance-capacity integrating circuit comprising resistance 121 is inserted between the output of the pulse stretching stage including valve 49 and the input to the amplifying and phase reversing stage 52 (the elements 49, 50, 51 and 52 are the same as in Fig. 1). If the aerial sweeps across a target whose range is within the zone of ranges then being passed by the gating system, a train of pulses at the radar pulse repetition frequency will appear at the cathode of valve 49—in the particular case above specified, a train of six pulses at a frequency of 1200 per second. The waveform of each pulse at the cathode of valve 49 will consist of a sharp rise followed by a substantially exponential decay determined by the values of elements 50 and 51. Resistance 121 is made several times larger than resistance 50 so that the shunting action of the circuit 121, 122 on the waveform at the cathode of valve 49 is negligible. The time constant provided by the elements 121, 122 is made approximately equal to or slightly greater than the time occupied by a pulse train of the length to be passed—in this case about 5 milli-secs.

If desired, and in order to completely suppress interference by single pulses from nearby radar sets, stage 52 may be biassed slightly beyond cut-off.

In the modification shown in Fig. 6 the valve 52 in the stage (52 of Fig. 1) following the pulse stretching stage is biassed almost to cut off as before, but is includes in its anode circuit a parallel circuit consisting of inductance 123 and capacity 124, resonant at the pulse repetition frequency (1200) and shunted by a resistance 125 of such value that the build-up time of the circuit 123—124—125, taking into account any impedances represented by the valve anode circuit and any loading thrown back by the next following stage is of the same order as the time taken by a train of the number of pulses to be passed. The signal passed by this arrangement may be used to effect recording in any of a variety of ways but, in the simple arrangement shown in Fig. 6, the coil 123 is coupled to a coil which is across one diagonal of a bridge rectifier 127 the other diagonal of which delivers negative output voltage to the recording amplifier 53.

The arrangement of Fig. 6 will obviously protect against single interference pulses as does that of Fig. 5. In both cases, however, continuous noise e.g. receiver noise, when gated by the amplifier 36 will produce a signal at the radar pulse repetition frequency such as would be passed by the protection circuits shown. This defect can be obviated in the case of the arrangement shown in Fig. 6 by gating the amplifier 36 at twice the radar pulse repetition frequency instead of at that frequency itself, i.e. in the numerical example considered, at 2400 instead of at 1200. If this is done each alternate gating pulse of the doubled frequency pulses will operate in the manner already described with reference to Fig. 1. The presence of the remaining pulses however, each of which is delayed by $\frac{1}{2400}$ of a second with respect to the immediately preceding pulse will secure the result that excitation of the circuit 123, 124, 125 will be effected by all the pulses, i.e. 2400 times a second, alternate pulses seeking to secure excitation in anti-phase with that tending to be produced by the remaining pulses. If integration could occur in the circuit 123, 124, 125 over a very long period continuous receiver would be completely canceled out. Although integration in this circuit can only occur over a limited number of pulses—5 in the example stated—such complete cancellation will not be obtained but there will nevertheless be a substantial reduction in the effect of continuous receiver noise in masking weak signals.

While I have described my invention in certain preferred embodiments, I realize that modifications may be made, and I desire that it be understood that no limitations upon my invention are intended other than may be imposed by the scope of the appended claims.

I claim:

1. A radar system comprising a radio pulse transmitter, a radio pulse receiver for receiving signals from said transmitter as reflected from objects in different directions from the system, antenna means for said system, means for varying the orientation of said antenna means in azimuth, a record surface, at least one signal operable recorder adapted to record signals upon said surface, means for scanning said recorder in a circular direction, said scanning being related to the angular orientation of said antenna, means for scanning said recorder in a radial direction whereby the recorder scans the area of the surface in a pattern or raster, said radial scanning being at a speed which is very much slower than the speed of radial deflection in a normal radar display tube, a pulse stretching circuit, means to apply received echo signals to said pulse stretching circuit, means for producing a control signal dependent upon the radial position of the scanning means, and means controlled by said control signal for passing to said recorder, signals derived from echo signals whose echo time is in predetermined relationship to said control signal, said signals being passed to said recorder at times when the position thereof with respect to the position of the circular scanning means corresponds to the instantaneous orientation of the antenna means in azimuth.

2. A system as claimed in claim 1 wherein the speed of radial scanning is low in relation to the speed of circular scanning whereby an approximately spiral raster is produced.

3. A system as claimed in claim 1 wherein the speed of radial scanning is low in relation to the speed of circular scanning whereby an approximately spiral raster is produced and wherein means are provided for scanning in the radial direction in short steps.

4. A system as claimed in claim 1 wherein said means for producing a control signal comprises a condenser, a voltage source, means connecting the voltage source on the initiation of each radial traverse of the recorder scanner to charge the condenser linearly, and means to discharge the condenser at the end of the traverse.

5. A system as claimed in claim 1 wherein the control signal is a saw tooth wave produced by a potentiometer driven in correspondence with the radial component of movement.

6. A pulsed radar system in accordance with claim 1 comprising a delay circuit, means to apply a component of transmitted pulse to said delay circuit whereby the pulse component is delayed by an amount determined by said control voltage, a "gate" circuit in the signal channel to the recorder and means to apply said delayed pulse component to open the "gate," said "gate" circuit being normally closed.

7. A system as claimed in claim 1 comprising a recorder having a plurality of recording styli spaced apart along an endless belt driven at a speed which determines the radial component of scanning, said belt being arranged to carry said styli to contact with the record surface in immediate succession and to move in immediate succession along a radial line in which said belt lies, means being provided for rotating said belt about one end of said radial line.

8. A system as claimed in claim 1 wherein the radial scanning is at a speed which is low in relation to the circular scanning whereby an approximately spiral raster is produced, comprising at least one recording stylus on a radially movable member carried by a ring-like member rotated at a speed determined by the circular movement in azimuth of the receiving antenna, driving means for driving said radially movable member radially in one direction in steps during a predetermined number of revolutions of said ring-like member and returning it rapidly to its original position during the next revolution.

9. A system as claimed in claim 1 comprising a plurality of radially spaced recording styli insulated from one another and fixed in relation to one another, a corresponding plurality of recording amplifiers, means to feed said styli each from a separate recording amplifier with signals derived from echo signals whose echo time is in predetermined relationship to the instantaneous magnitude of the control signal, the relationship in the case of each stylus differing from the relationship applying to the adjacent stylus by an amount corresponding to the radial separation between the two styli in question.

10. A system as claimed in claim 1 wherein the scanning in the radial direction is at a speed which is low in relation to the scanning in the circular direction whereby an approximately spiral raster is produced, wherein two styli are provided on the radially movable member radially spaced by a distance corresponding to the radial distance between a plurality of turns of the scanning raster produced.

11. A system as claimed in claim 1 comprising a delay circuit, means to apply a component of transmitted pulse to said delay circuit whereby the pulse component is delayed by an amount determined by said control voltage, a "gate" circuit in the signal channel to the recorder, and means to apply said delayed pulse component to open said "gate," said "gate" circuit being normally closed, means responsive to the reception of a train of waves consisting of a predetermined plurality of radar echo pulses for preventing or substantially reducing the recording of single pulse signals.

12. A system as claimed in claim 1 comprising a circuit resonant to the radar pulse repetition frequency and having a build-up time approximately equal to the time taken by said plurality of radar echo pulses, and means connecting said resonant circuit in the channel to the recorder.

13. A system as claimed in claim 1 wherein said means comprise a time constant circuit having a time constant approximately equal to the time taken by said plurality of radar echo pulses, and means connecting said time constant circuit in the channel to the recorder.

14. A pulsed radar system in accordance with claim 1 comprising a delay circuit, means to apply a component of transmitted pulse to said delay circuit whereby the pulse component is delayed by an amount determined by said control voltage, a "gate" circuit in the signal channel of the recorder and means to apply said delayed pulse component to open the "gate," said "gate" circuit being normally closed, wherein there is provided in the channel between the gated valve and the recorder an oscillation generator, means to modulate said generator by the echo signals passed by the gated valve and means to apply the trains of modulated signals to the recorder.

15. A system as claimed in claim 1 comprising means for producing relative motion between the recorder and the recording surface, said motion being additional to the scanning motion and being representative of the ships compass course and logged motion respectively, whereby the tracks of echo signal sources will be recorded.

References Cited in the file of this patent

UNITED STATES PATENTS

| | | |
|---|---|---|
| 2,430,283 | Epstein | Nov. 4, 1947 |
| 2,534,820 | Hurvity | Dec. 19, 1950 |